United States Patent Office 3,435,086
Patented Mar. 25, 1969

3,435,086
SELF-REGENERATIVE DEHYDROGENATION CATALYST FOR ELECTRIC RESISTANCE HEATED REACTORS
Frederick J. Soderquist, Essexville, Harold D. Boyce, Coleman, and Paul E. Kline, Midland, Mich., assignors to The Dow Chemical Company, Midland, Mich., a corporation of Delaware
No Drawing. Filed Jan. 9, 1967, Ser. No. 607,889
Int. Cl. C07c 15/10
U.S. Cl. 260—669          6 Claims

ABSTRACT OF THE DISCLOSURE

Self-regenerative dehydrogenation catalysts containing a major portion of chromium oxide or certain mixtures of chromium oxide, iron oxide, zinc oxide and magnesium oxide have improved electrical resistivity characteristics for use in an electrically heated catalytic reactor for the preparation of vinyl monomers by the dehydrogenation of hydrocarbons. By appropriate combination of these catalytic metal oxides, self-regenerative dehydrogenation catalysts can be fabricated with an optimum resistivity for particular reactor designs and process conditions.

BACKGROUND

In U.S. Patent 3,288,871, Soderquist, Boyce and Kline describe a new and efficient method for furnishing supplemental heat to catalytic reactors for the preparation of vinyl monomers by the dehydrogenation of hydrocarbons with a self-regenerative metal oxide catalyst. This process is based on the discovery that certain self-regenerative catalysts develop in use a steady state electrical resistivity such that the catalyst can be used as an electrical resistance heating element to provide part of the heat required by the process. Suitable self-regenerative catalysts disclosed for this process were those based on iron oxide, zinc oxide or mixtures thereof.

Subsequent research with reactors designed to utilize this process disclosed a need for self-regenerative catalysts with a wider resistivity range than those based on iron or zinc oxide. Although numerous metal oxides have been examined as potential dehydrogenation catalysts few have met the stringent commercial requirements. Any modification to improve the electrical resistivity of a catalyst cannot significantly impair other critical properties including catalyst life and stability as well as process conversions and yields.

SUMMARY

It has now been discovered that self-regenerative dehydrogenation catalysts amenable to electric resistance heating can be prepared using chromium oxide as the catalytic metal oxide or certain mixtures of chromium oxide, iron oxide, zinc oxide and magnesium oxide. More specifically it has been discovered that self-regenerative dehydrogenation catalysts containing as initially prepared at least about 50 weight percent of chromium oxide or of a mixture consisting essentially of (1) a major proportion by weight chromium oxide, iron oxide or zinc oxide, and (2) a minor proportion by weight of at least one other metal oxide from the group consisting of chromium oxide, iron oxide, zinc oxide and magnesium oxide, have a steady-state resistivity under normal operating conditions. The steady-state resistivity of these catalysts can be controlled up to about 1000 ohm-centimeters by appropriate blending of these catalytic metal oxides. Thus it is possible to fabricate a self-regenerative dehydrogenation catalyst amenable to electric resistance heating with a resistivity suitable for a variety of reactor configurations and process conditions.

DESCRIPTION

Preparation of vinyl monomers by the catalytic dehydrogenation of hydrocarbons is widely practiced. Of the many catalysts examined for this reaction, the self-regenerative Kearby catalysts are particularly suitable for the preparation of vinylaromatics such as styrene, vinyltoluene and divinylbenzene and also $C_4$–$C_5$ alkenes including 1,3-butadiene and isoprene. These catalysts normally contain in major proportion one or more oxides of iron, magnesium or zinc as the active catalytic component together with smaller amounts of potassium oxide or potassium carbonate and chromium oxide. The basic potassium compound, which may range in amount from about 5–35 weight percent of the catalyst as initially prepared, promotes reaction of carbon deposited on the catalyst with steam used as a feed diluent to form carbon monoxide and carbon dioxide thereby maintaining catalyst activity. Chromium oxide, usually about 4–10 weight percent, serves to stabilize the potassium promoter.

As described in Soderquist et al., U.S. Patent 3,288,871 certain self-regenerative catalysts have the further property of developing in use with a steam-diluted hydrocarbon feed an essentially steady-state electrical resistivity such that supplemental heating of the catalyst can be obtained by passing an electric current through the catalyst itself.

For example, in dehydrogenating ethylbenzene to styrene with a commercial iron oxide catalyst, the catalyst resistivity rapidly decreases during the first several hours of operation, but then becomes essentially constant for a prolonged period of operation. It is this essentially constant resistivity, referred to herein as the steady state resistivity, which makes feasible the electrical resistance heating of the catalyst.

The present invention, an improvement on the process described by Soderquist et al., developed from further study of this previously unrecognized catalyst property using refined experimental techniques. Using the dehydrogenation of ethylbenzene to styrene as a model system, it was discovered that the specific catalyst resistivity was influenced to a degree by such process variables as the reaction temperature, the feed ratio of steam to ethylbenzene, the ethylbenzene conversion and the feed rate. But within a broad operating range, e.g. reaction temperatures of 500–600° C. and conversions to styrene of 20–60%, the steady state resistivity of a self-regenerative iron oxide catalyst varied only from about 25–50 ohm-centimeters.

Although the resistivity of a catalyst is independent of reactor design and geometry, optimum performance of an electrical resistance heated reactor can be realized only if the catalyst resistivity can be controlled to degree by factors other than process variables. For an axial flow reactor as described in the examples of Soderquist et al., U.S. Patent 3,288,871 a resistivity of about 1 to 30 ohm-cm. permits effective electric resistance heating with a moderate current and voltage. However, with an electrically heated reactor with radial electric flow, e.g., a reactor with the catalyst held between two concentric cylindrical electrodes, the different electrode configuration may require for optimum efficiency a catalyst with a higher resistivity, e.g., 50–500 ohm-cm. under normal operating conditions. For such a reactor with a radial electric flow the electrical resistance R of the catalyst bed is given by the formula:

$$R = \frac{\rho}{2\pi L} \ln \frac{OD}{ID}$$

where $\rho$ is the resistivity of the catalyst, L is the length of the bed and $$\ln = \frac{OD}{ID}$$

is the natural log of the ratio of the outer and inner electrode diameter.

In heating the catalyst bed electrically, the potential electric heat is directly proportional to the bed resistance and catalyst resistivity. Under usual operating conditions, effective supplement electric resistance heating can be obtained with moderate amperage and voltage. With a radial current reactor such as described in Example 1, a catalyst resistivity of 150–200 ohm-cm. permits effective electric heating with conventional 220–240 volt power sources at amperages easily handled with standard equipment and insulation.

Commercial self-regenerative dehydrogenation catalysts normally contain in major portion iron oxide, zinc oxide or magnesium oxide. But recently Mahan et al. described in U.S. Patent 3,168,524 a self-regenerative chromium oxide catalyst for the dehydrogenation of alkylpyridines.

Self-regeneration catalysts based on iron, zinc, magnesium and chromium oxides have now been studied in a reactor with a radial current flow. Under standard test conditions the steady state resistivities observed in the dehydrogenation of ethylbenzene with the different metal oxide catalysts varied significantly, ranging from about 10–30 ohm–cm. with iron oxide catalysts to more than 700 ohm–cm. with a magnesium oxide catalyst. The steady state resistivity ($\rho_s$) of the zinc oxide and chromium oxide were of intermediate value.

The induction time required for a new catalyst to reach a steady state ($t_s$) also increased in the same order ranging from a few hours with a high iron oxide catalyst to more than a week with a high magnesium oxide catalyst.

It has now been discovered that a smaller amount of magnesium oxide can be effectively blended with iron oxide or another catalytic metal oxide to increase the catalyst resistivity without seriously impairing other catalytic properties. Similarly a minor portion of catalytic chromium oxide, iron oxide or zinc oxide can be blended wiht a major portion of a different metal oxide to achieve other resistivities. By appropriate blending of these metal oxides, a resistivity suitable for many varied reactor configurations can be obtained.

Conventional methods such as described by Mahan et al. in U.S. Patent 3,168,524 can be used in the preparation of blended metal oxide catalysts. Generally the metal oxide components are blended in oxide form, alternately metallic salts thermally convertible into oxide form, such as a corresponding acetate, carbonate, hydroxide, nitrate or sulfate, can be used. However, the catalyst compositions herein are all expressed in the conventional manner as weight percent metal oxide based on the dry weight of the blended catalyst composition.

As a basis for the comparison of catalyst resistivities, the rehydrogenation of ethylbenzene to styrene at a 40% conversion was chosen as a standard system with a feed rate of about 160–170 g./liter of catalyst/hr. each of ethylbenzene and water. The catalyst temperature is adjusted as required to obtain a conversion of about 40±2%. Although the hydrocarbon conversion to monomer and the catalyst temperature are interrelated process variables, extensive research and operating experience has established that the hydrocarbon conversion is the more critical variable in terms of the overall process performance. Hence this factor rather than the catalyst temperature is held constant in evaluating catalyst resistivities.

The following examples illustrate further the present invention. Unless otherwise specified, all parts and percentages are by weight.

EXAMPLE 1

Self-regenerative $Cr_2O_3$ catalyst (A) A radial current reactor was constructed by vertically mounting a 4.10 cm. inside diameter chrome steel tube about 90 cm. long. A second chrome steel tube with an outside diameter of 1.03 cm. was mounted concentrically inside the first tube as the inner electrode. The outer tube was electrically grounded. The reactor was filled to a depth of about 20 cm. with porcelain saddles followed by about 300 ml. of 4.75 mm. diameter pelleted catalyst giving a catalyst bed depth of about 25.5 cm. The upper portion of the reactor was filled with additional porcelain saddles as a preheating section.

Then connections were made to feed separately the hydrocarbon and water into the upper portion of the preheater and to collect the liquid products from the bottom outlet with provision to measure the volume of gaseous products prior to venting. Finally an electrically heated oven was placed around the reactor with suitable controls to maintain a uniform catalyst temperature as indicated by a thermocouple at the midpoint of the catalyst bed.

(B) A 92.9 wt. percent chromium oxide catalyst was prepared by dry blending 929 parts of finely divided chromium oxide with 70 parts potassium carbonate and 1 part of tannic acid in a Lancaster multi-type mixer for 45 minutes. The tannic acid serves as a binder and extrusion aid. Mixing is continued another 45 minutes after adding about 160 parts distilled water. The blend was formed into 3.3 x 4.5 mm. pellets and the pellets dried for 18 hrs. at room temperature and at about 175° C. for 24 hrs. The resulting catalyst had a bulk density of 1.744 g./ml.

(C) The radial current reactor described above was charged with 300 ml. of the 92.9% $Cr_2O_3$ catalyst. The reactor was heated to about 595° C. Then the water and ethylbenzene feed was begun at rates of 50.7 g./hr. and 49.8 g./hr. respectively. This corresponds to a total feed rate of about 335 g/liter of catalyst/hr.

Representative samples of the vent gas and liquid product were analyzed at intervals and the conversion of ethylbenzene to styrene and yield of the styrene were calculated. For 276 hrs. operation an average 39.8% conversion and 92.9% yield of styrene were obtained.

Also at intervals the total electric resistance of the reactor was measured. Then from the known bed geometry and the resistance formula, the catalyst resistivity was calculated. In the first 10 hrs. operation, the resistivity dropped from an initial value of about $3 \times 10^5$ ohm-cm. to about 650 ohm-cm. A fairly constant resistivity ($\rho_s$) of about 220 ohm-cm. was reached after about 100 hrs. operation ($t_s$).

EXAMPLE 2

Self-regenerative $Fe_2O_3$ catalyst (A) To evaluate the effect of several process variables on the resistivity of the self-regenerative catalysts with a radial current reactor, the reactor described in Example 1 was charged with 300 ml. of a self-regenerative iron oxide catalyst containing 87.9% $Fe_2O_3$. Under standard conditions with a total feed of 330–340 g./l. cat./hr. of water and ethylbenzene and a conversion of 40%, a steady state resistivity of about 35 ohm-cm. was obtained after about 2 hrs. operation at 585° C. Typical resistivities observed under other process conditions are summarized in Table 1.

TABLE 1.—EFFECT OF PROCESS VARIABLES ON RESISTIVITY OF AN IRON OXIDE CATALYST

| Variable | | Low | High | $\rho_s$-ohm-cm. | |
|---|---|---|---|---|---|
| | | | | Low | High |
| Run: | | | | | |
| 2-1 | Standard conditions [1] | | | 35 | 35 |
| 2-2 | Conversion, percent | 10 | 50 | 51 | 27 |
| 2-3 | Reactor T., ° C | 500 | 600 | 51 | 27 |
| 2-4 | Wt. ratio $H_2O/C_8H_{10}$ | 1.0 | 2.5 | 33 | 46 |
| 2-5 | Total g./l.cat./hr. | 160 | 880 | 51 | 34 |

[1] 40% conversion; 585° C.; Wt. ratio $H_2O/C_8H_{10}$—1.0; 340 g./l. cat./hr.

(B) In a similar reactor using a self-regenerative catalyst containing 87.6% Fe₂O₃ and a total feed rate of 1.3 kg./l./hr., an applied potential of 3.0–3.3 volts was used to electrically heat the catalyst for a total operating of 288 hrs. The resistivity of the catalyst varied from about 27–40 ohm-cm. during the run. The conversion of ethylbenzene to styrene was 40.9% and the styrene yield 94.9%.

EXAMPLE 3

Comparative metal oxide resistivities

The resistivities of several self-regenerative metal oxide catalysts were measured under the standard conditions described in Example 2 using the radial current reactor with the results summarized in Table 2.

TABLE 2.—STEADY STATE RESISTIVITIES

| Catalyst¹ | T., ° C. | Resistivity ρₛ, ohm-cm. | tₛ, hrs. | Average Conversion, Percent | Yield, Percent |
|---|---|---|---|---|---|
| Run: | | | | | |
| 1 ---------- 92.9% Cr₂O₃ | 595 | 220 | 100 | 39.8 | 92.9 |
| 2 ---------- 87.9% Fe₂O₃ | 585 | 35 | 2 | 40.0 | 93 |
| 3–1 ------- 87.9% ZnO | 618 | 90 | 72 | 40.2 | 92.9 |
| 3–2 ------- 87.9% MgO | 600 | 715 | 200 | 40.3 | 92.9 |

¹ Other components were 7.0% K₂CO₃, 5.0% Cr₂O₃ and 0.1 tannic acid.

EXAMPLE 4

Mixed metal oxide catalysts

A series of self-regenerative mixed metal oxide catalysts were prepared using catalytic grade iron, zinc, chromium and magnesium oxides with a standard 7% K₂CO₃ as a promoter and 0.1% tannic acid as a binder and extrusion aid. Also with the non-chromium oxide blends, 5% chromium oxide was added as a standard stabilizer for the potassium promoter. The catalyst pellets were prepared from the appropriate oxide blends as described in Example 1–B.

Typical catalyst compositions are given in Table 3. As a control a high iron oxide catalyst was prepared and tested concurrently. Steady state resistivities under the standard ethylbenzene dehydrogenation conditions are given in Table 4.

TABLE 3.—MIXED METAL OXIDE CATALYSTS COMPOSITION, WT. PERCENT

| Catalyst | Fe₂O₃ | MgO | ZnO | Cr₂O₃ | K₂CO₃ | Tannic Acid |
|---|---|---|---|---|---|---|
| 4–1 | 87.9 | | | 5.0 | 7.0 | 0.1 |
| 4–2 | 70.3 | 17.6 | | 5.0 | 7.0 | 0.1 |
| 4–3 | 52.7 | 35.2 | | 5.0 | 7.0 | 0.1 |
| 4–4 | 65.0 | | | 27.9 | 7.0 | 0.1 |
| 4–5 | 55.7 | | | 37.2 | 7.0 | 0.1 |

We claim:

1. In a process for the preparation of vinyl monomers by the catalytic dehydrogenation of hydrocarbons in the presence of water and vapor and an electrically conductive self-regenerative metal oxide catalyst, the improvement which comprises using a self-regenerative metal oxide catalyst which:
   (A) Contains as the catalytic oxide as initially prepared at least about 50 weight percent of:
      (1) Chromium oxide;
      (2) A mixture consisting essentially of a major proportion by weight of chromium oxide and a minor proportion by weight of at least one other metal oxide selected from the group consisting of iron oxide, zinc oxide, and magnesium oxide;
      (3) A mixture consisting essentially of a major proportion by weight of iron oxide or zinc oxide and a minor proportion of at least 10 weight percent of chromium oxide; or
      (4) A mixture consisting essentially of a major proportion by weight of zinc oxide and a minor proportion by weight of magnesium oxide; and
   (B) Has under normal dehydrogenating conditions a steady state electrical resistivity.

2. The process of claim 1 wherein the catalytic oxide is chromium oxide.

3. The process of claim 1 wherein the catalytic oxide is a mixture of a major proportion by weight of iron oxide and a minor proportion by weight of chromium oxide.

4. The process of claim 1 wherein the catalytic oxide is a mixture of a major portion by weight of zinc oxide and a minor proportion by weight of chromium oxide.

5. The process of claim 1 wherein the catalytic oxide is a mixture of a major proportion by weight of zinc oxide and a minor proportion by weight of magnesium oxide.

6. The process of claim 1 wherein the catalytic oxide is a mixture of a major portion by weight of chromium oxide and a minor proportion by weight of magnesium oxide.

TABLE 4.—STEADY STATE RESISTIVITIES

| Catalyst Mixed Oxides | T., ° C. | Resistivity ρₛ, ohm-cm. | tₛ, hrs. | Average Conversion, Percent |
|---|---|---|---|---|
| 4–1 ---------- Fe₂O₃ | 570 | 25 | 1 | 39.8 |
| 4–3 ---------- Fe₂O₃/MgO | 575 | 354 | 2 | 40.0 |
| 4–4 ---------- Fe₂O₃/Cr₂O₃ | 580 | 380 | 4 | 40 |

References Cited

UNITED STATES PATENTS 3,288,871  11/1966  Soderquist et al. _____ 260—669

DELBERT E. GANTZ, *Primary Examiner.*

C. R. DAVIS, *Assistant Examiner.*